(No Model.)

W. D. & C. A. RICHARDSON.
BLACKING BOX HOLDER.

No. 264,566. Patented Sept. 19, 1882.

Witnesses:
Franck L. Ourand
Newton L. Collamer

Inventors:
William D. Richardson
Charles A. Richardson
by Crosby & Co.
Att'ys

UNITED STATES PATENT OFFICE.

WILLIAM D. RICHARDSON AND CHARLES A. RICHARDSON, OF TAUNTON, MASSACHUSETTS.

BLACKING-BOX HOLDER.

SPECIFICATION forming part of Letters Patent No. 264,566, dated September 19, 1882.

Application filed June 27, 1882. (No model.)

*To all whom it may concern:*

Be it known that we, W. D. RICHARDSON and C. A. RICHARDSON, of Taunton, in the county of Bristol and State of Massachusetts, have invented certain new and useful Improvements in Blacking-Box Holders; and we do hereby declare that the following is a full, clear, and exact description of the invention, which will enable others skilled in the art to which it appertains to make and use the same, reference being had to the accompanying drawings, which form a part of this specification.

Figure 1:
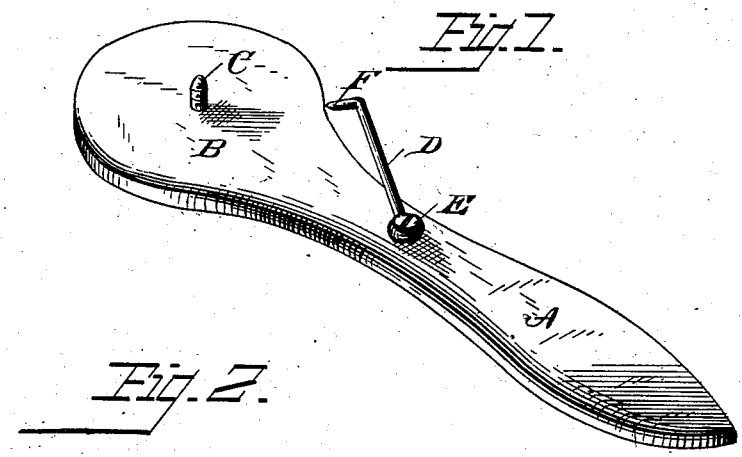
Figure 2:
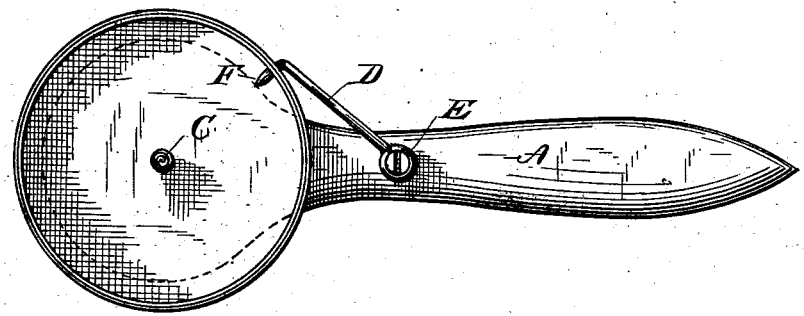
Figure 3:
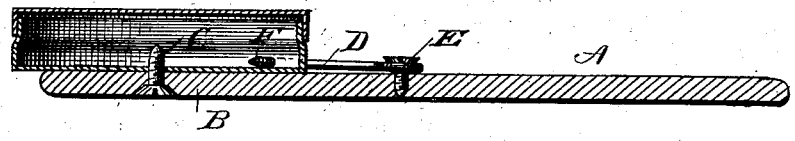

Figure 1 is a perspective view of our improved blacking-box holder. Fig. 2 is a plan view of the same with a blacking-box in position, and Fig. 3 is a longitudinal sectional view.

Corresponding parts in the several figures are denoted by like letters of reference.

This invention relates to blacking-box holders or devices to which blacking-boxes may be attached and conveniently held while in use without danger of soiling the fingers; and our invention consists in certain improvements in the construction of said holder, which will be hereinafter fully described, and particularly pointed out in the claim.

A in the drawings represents a suitable handle, made of wood or other material, and terminating in a disk or plate, B, having an upward-projecting screw-stud, C.

D is a hook, pivoted at E upon the handle A, closely adjoining the disk B, and having a sharp point, F. Said hook, instead of being pivoted upon the handle, may, however, be pivoted upon the disk or in any suitable position without changing the nature of our invention.

To use our invention a small hole is formed in the bottom of the blacking-box, which is then adjusted upon the screw-stud C until it rests upon the disk or plate B. The sharp-pointed hook D is then driven through the side of the box, which is thereby prevented from turning, and thus held securely in position upon the holder.

This device is exceedingly simple, convenient, and neat, and it may be made and supplied at a trifling expense.

Having thus described our invention, we claim and desire to secure by Letters Patent of the United States—

As an improvement in blacking-box holders, the disk or plate B, having screw-stud C and handle A, and provided with the pivoted sharp-pointed hook D, as and for the purpose set forth.

In testimony that we claim the foregoing as our own we have hereto affixed our signatures in presence of two witnesses.

WILLIAM DEAN RICHARDSON.
   CHARLES ABBOTT RICHARDSON.

Witnesses:
 ELISHA T. JACKSON,
 H. T. MONTGOMERY.